United States Patent
Matsunaga et al.

[11] Patent Number: 6,114,828
[45] Date of Patent: Sep. 5, 2000

[54] APPARATUS AND METHOD FOR PREVENTING OVERLOAD ON SWITCHING DEVICE IN INVERTER CIRCUIT FOR MOTOR APPLICABLE TO ELECTRIC VEHICLE

[75] Inventors: Yasuo Matsunaga; Norifumi Isaji, both of Kanagawa, Japan

[73] Assignee: Nissan Motor Co., Ltd., Yokohama, Japan

[21] Appl. No.: 09/236,396

[22] Filed: Jan. 25, 1999

[30] Foreign Application Priority Data

Jan. 26, 1998 [JP] Japan .................................. 10-013038

[51] Int. Cl.[7] ................................ H02P 1/04; H02H 5/04
[52] U.S. Cl. ........................ 318/782; 318/430; 318/431; 180/65.8
[58] Field of Search ..................................... 318/623, 624, 318/705–708, 716–718, 720–724, 781–783, 430, 431; 180/65.1, 65.8

[56] References Cited

U.S. PATENT DOCUMENTS

| | | | |
|---|---|---|---|
| 3,940,669 | 2/1976 | Tsuboi et al. ............................ | 318/721 |
| 5,101,315 | 3/1992 | Ishikawa et al. ......................... | 361/24 |
| 5,376,869 | 12/1994 | Konrad ................................... | 318/587 |
| 5,444,351 | 8/1995 | Yamamura et al. ..................... | 318/811 |
| 5,446,362 | 8/1995 | Vanek et al. ............................ | 318/801 |
| 5,535,115 | 7/1996 | Kishi et al. .............................. | 363/98 |
| 5,541,494 | 7/1996 | Sannomiya et al. .................... | 318/801 |
| 5,721,479 | 2/1998 | Kumar et al. ........................... | 318/801 |
| 5,770,901 | 6/1998 | Niimi et al. ............................. | 310/52 |
| 5,926,010 | 7/1999 | Hosokawa et al. ..................... | 323/222 |

FOREIGN PATENT DOCUMENTS

| | | |
|---|---|---|
| 5-115106 | 5/1993 | Japan . |
| 6-225411 | 8/1994 | Japan . |
| 8-191503 | 7/1996 | Japan . |

*Primary Examiner*—Brian Sircus
*Attorney, Agent, or Firm*—Foley & Lardner

[57] ABSTRACT

In control apparatus and method for an electric vehicle, when the motor is determined to be locked during a run of the vehicle on an ascending slope, a limitation torque $\tau r$ of the motor as a function of a maximum value $T_{JMAX}$ of estimated junction temperatures of respective switching devices of an inverter circuit is determined, an output torque $\tau L$ for the motor to be escaped from the locked state is calculated as $\tau L = \tau \Gamma - \Delta \tau$, wherein $\Delta \tau$ denotes a displacement torque, $\Delta \tau = \Delta \tau + A$ when $\tau r < \tau c$ and a phase domain of the motor determined on the basis of a magnetic pole position $\theta$ is the same as the previous one and $\Delta \tau = 0$ when $\tau r \geq \tau c$ and the phase domain is not the same as the previous one.

20 Claims, 4 Drawing Sheets

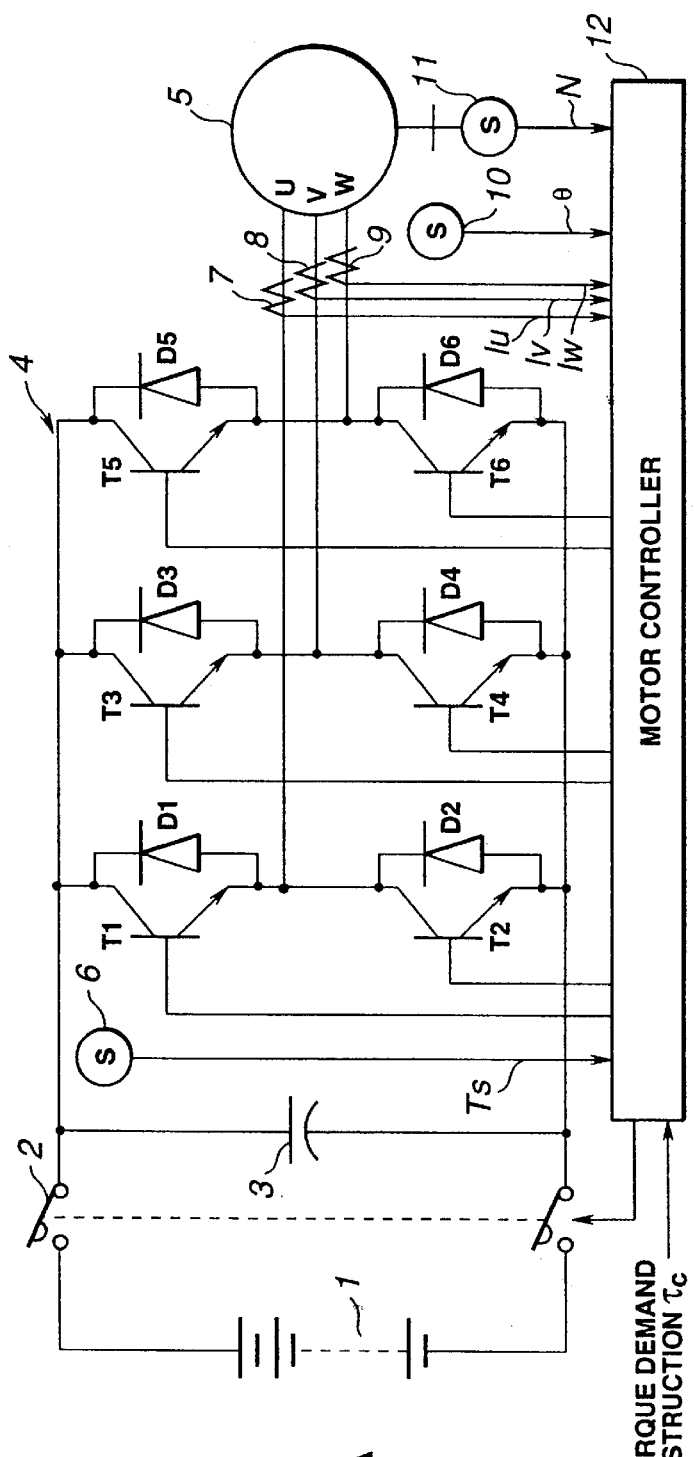
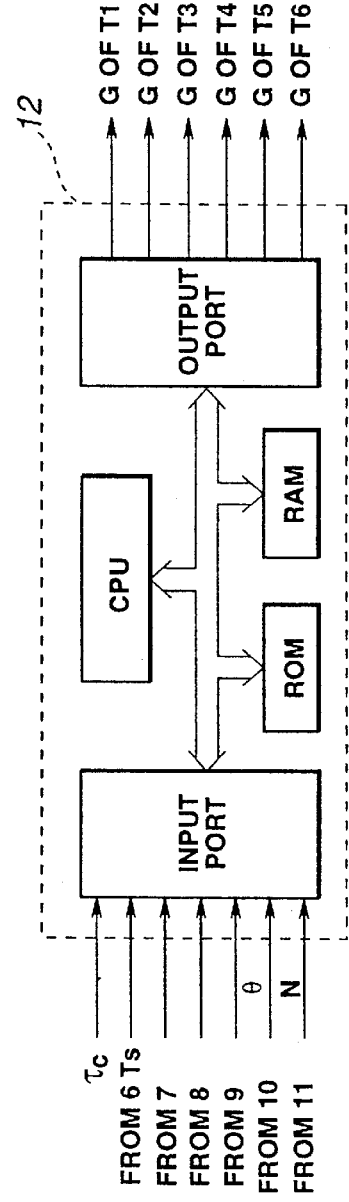
FIG.1A
FIG.1B

APPARATUS AND METHOD FOR PREVENTING OVERLOAD ON SWITCHING DEVICE IN INVERTER CIRCUIT FOR MOTOR APPLICABLE TO ELECTRIC VEHICLE

BACKGROUND OF THE INVENTION a) Field of the Invention

The present invention relates generally to apparatus and method for preventing overload applied to any one of a plurality of semiconductor switching devices installed on arms of an inverter main circuit (hereinafter, also simply called an inverter circuit or a motor drive) for a motor-driven electric car (also called an electric vehicle).

The motor is driven by means of an AC power, the AC power having a plurality of phases and into which a DC power is inverted by means of the plurality of semiconductor switching devices, and the electric car is caused to run through the motor.

The present invention, more particularly, relates to the apparatus and method described above in which, when the electric car is trying to run up-hill (running on an ascending slope) with the motor locked, a state in which an excessive current flow causing an overload through any one of the switching devices which is presently driving the motor is prevented from occurring and which can easily be escaped from the motor locked state.

b) Description of the Related Art

Such a type of the electric car as described above often involves such a case as not being started to run when an accelerator pedal is slowly depressed during the run on the ascending slope. That is to say, the electric car has the motor developing a predetermined output torque according to a depression depth of the accelerator pedal and is started to run when the motor develops the output torque which is larger than a running resistance against the vehicle. If the driver depresses slowly the accelerator pedal, a variation rate of the output torque of the motor is so small that it takes a lot of time for the vehicle to be started to run when the running resistance against the vehicle is relatively large as is the case of the vehicular run of the ascending slope. The motor is locked for a time duration until the electric car is started to run. When the motor is locked, a particular phase current is continuously caused to flow through only the particular one of the switching devices of the inverter circuit which supplies the particular phase current to the motor.

When the locked state of the motor is continued for a long period of time, a temperature of the current flowing through the particular one of the switching devices in the inverter circuit is raised. A control of limiting the output of the motor due to a temperature protection of the current flowing through any particular switching device is performed.

SUMMARY OF THE INVENTION

As described in the BACKGROUND OF THE INVENTION, since the locked state of the motor is continued for the long time duration when the electric car is slowly started to run from its stopped state on the ascending slope and the output of the motor is limited in order to protect the semiconductor devices from being overloaded (overheated), the electric car cannot be started to run as desired by the vehicle driver due to the limitation on the output of the motor even if the accelerator (pedal) is quickly and deeply depressed.

It is, therefore, an object of the present invention to provide apparatus and method for preventing any one of the switching devices in the inverter circuit for the motor applicable to the electric vehicle from being overloaded in which each of the switching devices can sufficiently be protected from being overloaded and the motor can easily be dropped out of the locked state even if the motor becomes locked during the run of the vehicle on such an ascending slope as described above.

The above-described object can be achieved by providing a control apparatus for an electric vehicle. The control apparatus comprises: a motor drive, having a plurality of arms and each arm including a series-connected semiconductor switching device pair for switching a voltage applied across each switching device of the corresponding one of the switching device pairs from a DC power supply so as to apply an AC power having a plurality of phases of the same number of the arms to the motor, the vehicle being driven by means of the motor; a sensor for detecting a rotation velocity of the motor; a torque demand instruction value determinator for determining a value of a torque demand instruction that a vehicle driver has demanded; a locked state determinator for determining whether the electric vehicle falls in a locked state on the basis of the detected rotation velocity of the motor and the determined torque demand instruction value; a motor drive controller for controlling switching operations of the respective pairs of the switching devices in the motor drive for the respective switching pairs of the motor drive to supply respective phase currents to the motor so as to regulate an output torque of the motor according to the torque demand instruction value; and a torque reducer for outputting a command to the motor drive controller to reduce the output torque of the motor so as to change a present phase domain of the motor to another phase domain when the locked state determinator determines that the electric vehicle has fallen in the locked state.

The above-described object can also be achieved by providing a control method for a motor driven electric Vehicle. The control method comprises: switching a voltage applied across each semiconductor switching device of a motor drive from a DC power supply so as to apply an AC power having a plurality of phases to the motor, through the motor drive having a plurality of arms of the same number of the phases of the AC power, each arm including a pair of the same series-connected semiconductor switching devices; detecting a rotation velocity of the motor; determining a value of a torque demand instruction that a vehicle driver has demanded; determining whether the electric vehicle falls in a locked state on the basis of the detected rotation velocity of the motor and the determined torque demand instruction value; controlling switching operations of the respective pairs of the switching devices in the motor drive for the respective switching pairs of the motor drive to supply respective phase currents to the motor through a motor drive controller so as to regulate an output torque of the motor according to the torque demand instruction value; and outputting a command to the motor drive controller to reduce the output torque of the motor so as to change a present phase domain of the motor to another phase domain when determining that the electric vehicle has fallen in the locked state.

BRIEF DESCRIPTION OF THE DRAWINGS

FIG. 1A is a schematic whole diagram of a motor driving circuitry of an electric vehicle to which an apparatus for preventing an overload on any one of switching devices of an inverter circuit for the motor in a preferred embodiment according to the present invention is applicable.

FIG. 1B is a schematic circuit block diagram of a motor drive controller shown in FIG. 1A.

BEST MODE FOR CARRYING OUT THE INVENTION

Figure 2A:
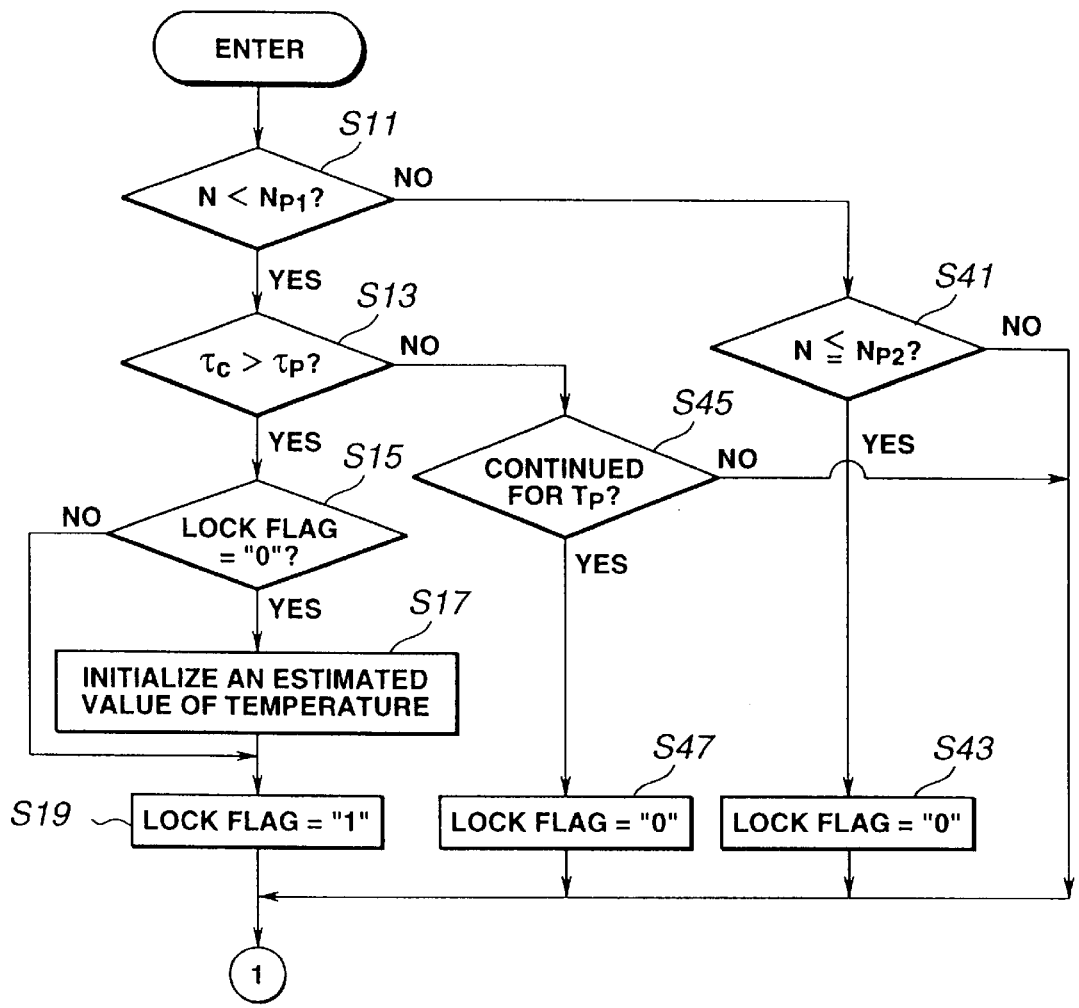
FIGS. 2A and 2B are integrally a flowchart executed in the motor drive controller for explaining an operation of the apparatus for preventing the overload on any one of the switching devices in the preferred embodiment according to the present invention is applicable.

Reference will hereinafter be made to the drawings in order to facilitate a better understanding of the present invention.

FIG. 1A shows a whole circuit configuration of a motor drive circuitry of an electric vehicle to which a control apparatus for an electric vehicle, namely, an apparatus for preventing an overload on any one of switching devices in an inverter circuit for the motor in a preferred embodiment according to the present invention is applicable.

FIG. 1B shows an internal configuration of a motor drive controller shown in FIG. 1A.

An electric motor (for example, a three-phase permanent magnet type synchronous motor) 5 to force the electric vehicle to be run, the motor 5 being operated in response to a supply of a three-phase AC power of U phase, V phase, and W phase developed by chopping a DC power from a vehicular battery 1 through an inverter circuit 4. It is noted that the DC power from the battery 1 is supplied to the inverter circuit 4 via the switch 2 and a capacitor 3 is connected to both ends of the inverter 4.

The inverter circuit 4 is constituted by sixth semiconductor switching devices T1 through T6 such as IGBTs (Insulated Gate Bipolar Transistors), power MOS FETs (Metal Oxide Semiconductor Field Effect transistors), or thyristors and protective (flywheel) diodes D1 through D6 connected in parallel to the respective switching devices T1 through T6. The inverter circuit 4 has, as shown in FIG. 1A, three arms, each arm having a pair of upper and lower switching devices of T1 and T2, T3 and T4, and T5 and T6.

Each switching device T1 through T6 is attached onto a cooling fin (not shown) on which a temperature detecting thermistor 6 for detecting a temperature Ts of each cooling fin is attached. The detected temperature Ts of each cooling fin is supplied to a motor drive controller 12. A plurality of current sensors 7, 8, and 9 constituted by current transformers are interposed in lines connected between junctions between the respective upper and lower switching devices T1 through T6 and respective three-phase input ends of the motor 5 in order to detect driving currents of the respective phases when the switching devices T1 through T6 of the inverter circuit 4 are operated to drive the motor 5. The current sensors 7, 8, and 9 detect output phase currents $I_U$, $I_V$, and $I_W$ of the inverter circuit (motor drive) 4 to be supplied to the motor 5 and the detected output phase currents $I_U$, $I_V$, and $I_W$ are supplied to the motor controller 12.

In addition, a magnetic pole position sensor 10 and rotation velocity sensor 11 are mounted in the motor 5. The magnetic pole position sensor 10 serves to detect a magnetic pole position θ of the motor 5. The rotation speed sensor 11 serves to detect a rotation velocity N of the motor 5. These detected magnetic pole position θ and the rotation velocity N of the motor 5 are supplied to the motor drive controller 12.

The motor drive controller 12, for example, constituted by a microcomputer and its peripheral circuitry, as shown in FIG. 1B.

The microcomputer of the motor drive controller 12 is constituted by a CPU (Central Processing Unit), a ROM (Read Only Memory), a RAM (Random Access Memory), an Input Port, an Output Port, and a common bus.

In the control apparatus for the electric vehicle in the preferred embodiment according to the present invention, when the electric vehicle is stopped and is about to start to run up-hill (on an ascending slope) and the motor 5 is locked, the torque outputted from the motor 5 is reduced by a predetermined value for each predetermined period of time so that the motor 5 is rotated so as to reverse the electric vehicle to a degree such that the vehicle driver does not sense that the vehicle is reversed so that the magnetic pole position θ of the motor 5 is varied, thus a phase domain of the motor 5 being varied. That is to say, a drive position of any pair of the switching devices T1 and T2, T3 and T4, and T5 and T6 with respect to the motor 5 is changed so as to escape the motor 5 from the locked state. In more details, since the current is continuously caused to flow only from a particular upper or lower switching device T1, T3, and T5 or T2, T4, and T6 into the motor 5 when the electric vehicle is stopped and is about to start to run up-hill (on an ascending slope) and the motor 5 is locked, the torque outputted from the motor 5 is reduced by a predetermined value for each predetermined period of time so that the motor 5 is rotated so as to reverse the electric vehicle to a degree such that the vehicle driver does not sense the reverse of the vehicle, thus a phase domain of the motor 5 being changed so that the magnetic pole position θ is varied. Thus, any one of the switching devices T1 through T6 in which the excessive current is caused to flow is changed to another of the remaining switching devices in which no excessive current is caused to flow. Consequently, a relatively large torque can be obtained from the motor 5 via the changed remaining switching device. Thereby, this causes the motor 5 to be escaped from the motor locked state and permits the protection of any particular switching device from being overloaded.

It is noted that the inverter circuit (motor drive) 4 having the sixth IGBTs as the switching devices is exemplified by a U.S. Pat. No. 5,541,494 issued on Jul. 30, 1996, the disclosure of which is herein incorporated by reference.

Figure 2B:
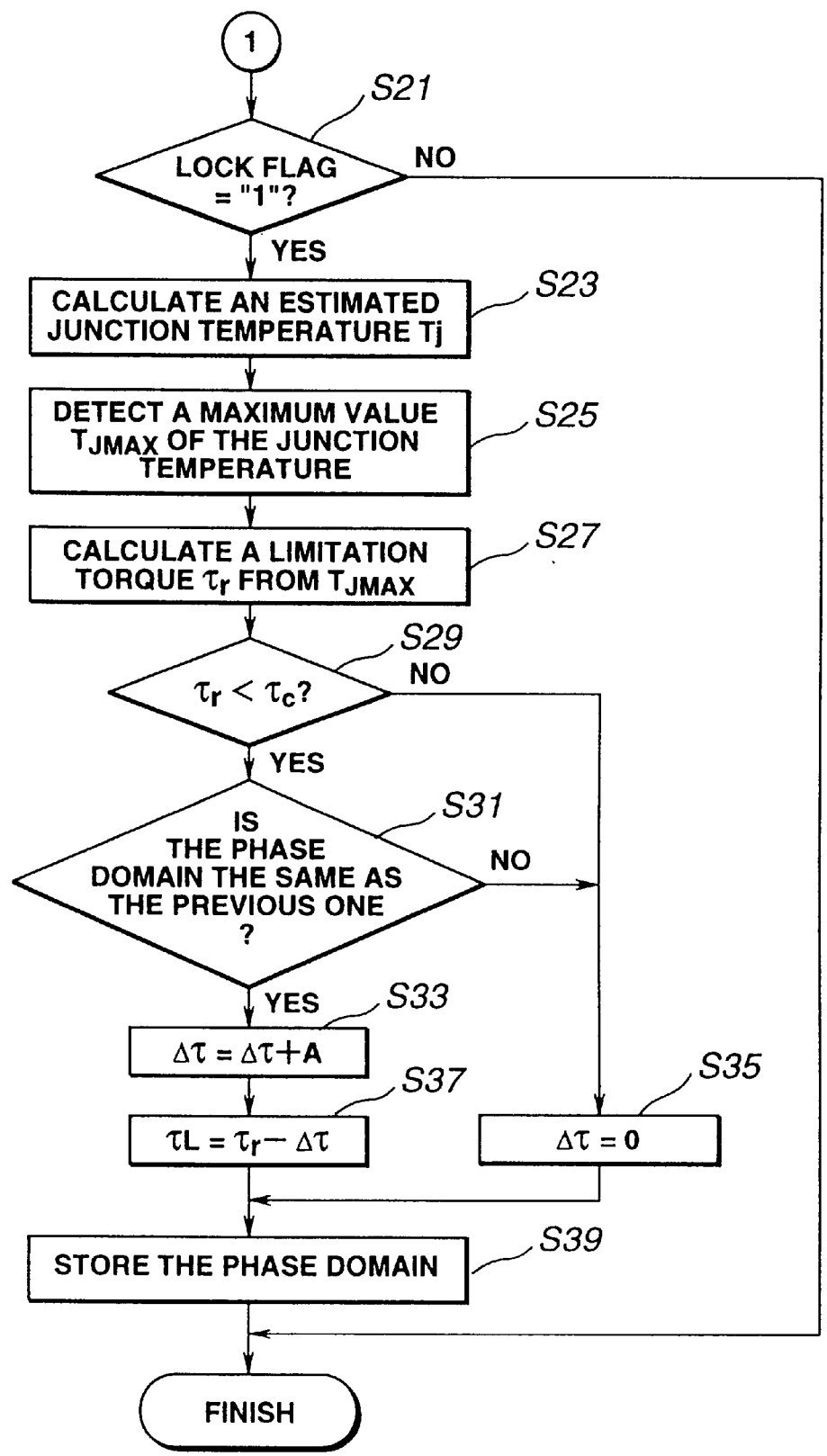

FIGS. 2A and 2B show integrally an operational flowchart for explaining an action of the control apparatus for the electric vehicle in the preferred embodiment.

At a step S11 of FIG. 2A, the CPU of the motor drive controller 12 determines whether the motor rotation velocity N of the motor 5 detected by the rotation velocity sensor 11 is below a first predetermined motor rotation velocity (Np1) such as approximately 100 rpm (revolutions per minutes). Furthermore, if the motor rotation velocity N is below the first predetermined motor rotation velocity (Np1) (Yes at the step S13), the CPU of the controller 12 determines whether τc>τp, wherein τc denotes a value of a motor torque demand instruction generated, for example, from an accelerator of the electric vehicle and τp denotes torque predetermined value, at a step S13.

If the torque demand instruction value τc is larger than the torque predetermined value τp at the step S13 (Yes), the CPU of the motor controller 12 determines that the motor 5 of the electric vehicle falls in a locked state including an extremely low rotation velocity state. It is noted that the predetermined torque value τp is a continuously driving enabling torque which is an output torque of the motor 5 generated when any one of the switching devices of the inverter circuit 4 is caused to flow a continuously allowable maximum current to the motor 5 and is, for example, 6.5 Kgfm.

On the other hand, if the motor rotation velocity N is equal to or above the first predetermined value of the motor velocity (Np1) (No at the step S13), the routine goes to a step S41. At the step S41, the CPU of the motor drive controller 12 determines whether the motor rotation velocity N is equal to or below a second predetermined motor rotation velocity Np2 such as 120 rpm.

If N≦Np2 (yes) at the step S41, the CPU of the motor drive controller 12 sets a lock flag to "0" at a step S43 to indicate that the motor 5 is not locked and the routine goes to a step S21.

In the preferred embodiment, the motor drive controller 12 is provided with two of the first and second predetermined values of the motor rotation velocity Np1 and Np2 used for the determination of the motor locked state and a hysterisis of, for example, 20 rpm is provided for the motor rotation velocity N. Hence, a chattering of repetitively changing the determination of the motor locked state can be prevented.

At the step S13, if the motor torque demand instruction value τc is equal to or not larger than the redetermined value of the torque τp, the routine goes to step S45.

The CPU of the motor controller 12 determines if the state in which τc≦τp is continued for a predetermined period of time (Tp) at the step S45.

If the state in which τc≦τp is continued for Tp at the step S45 (Yes), the routine goes to a step S47 in which the lock flag is set to "0" since the CPU of the controller 12 determines that the motor 5 is not locked. Then, the routine goes to the step S21.

If the state in which τc≦τp is not continued for the predetermined period of time Tp (No) at the step S45, the routine jumps to the step S21.

If yes at the step S11 (N<Np1) and yes at the step S13 (τc>τp), the CPU of the controller 12, at a step S15, determines if the lock flag indicating whether the motor 5 is locked is set to "0".

If the lock flag is set to "0" at the step S15 (Yes), the routine goes to a step S17 in which an initial value of the junction temperature TJ of each switching device T1 through T6 estimated from the cooling fin temperature Ts of each switching device T1 through T6 and from the cooling fin temperature Ts.

Then, the lock flag is set to '1 " at the step S19 and the routine goes to the step S21 in which the CPU of the motor drive controller 12 determines if the present state of the motor 3 is locked from the status of the lock flag.

In details, at the step S19, the CPU of the controller 12 determines whether the lock flag is set to "1 " to determine whether the present state of the motor 5 is in the locked state.

If not locked at the step S21 (No), the present routine of FIGS. 2A and 2B is ended.

If the lock flag is at a "1" and the motor 5 is determined to be locked, the CPU of the motor drive controller 12 calculates the junction temperature $T_J$ from the cooling fin temperature Ts of each switching device T1 through T6 at the next step S23. The CPU of the motor drive controller 12, at the next step S25, determines the maximum value $T_{JMAX}$ of each junction temperature $T_J$ calculated at the step S23.

Figure 3:
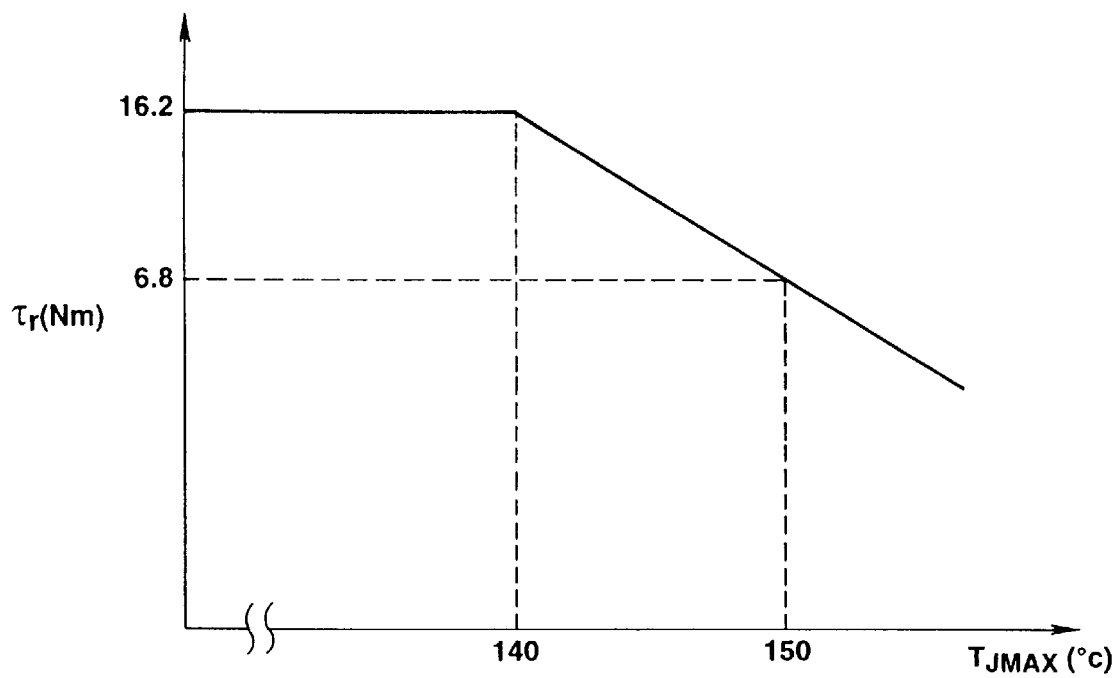
FIG. 3 is a characteristic graph of a map table representing a relationship between a limitation torque τr and a maximum value $T_{JMAX}$ of estimated junction temperature values for respective switching devices in the inverter circuit shown in FIG. 1A.

As described above, if the maximum value $T_{JMAX}$ of the respective junction temperatures of the switching devices T1 through T6 when the motor 5 is locked is determined, a limitation torque τr to the maximum value $T_{JMAX}$ of the junction temperatures on the respective switching devices T1 through T6 is calculated using a table map shown in FIG. 3 at the next step S27.

FIG. 3 shows the limitation torque τr to the maximum value $T_{JMAX}$ of the junction temperatures $T_J$ of the respective switching devices T1 through T6.

As shown in FIG. 3, if, for example, the maximum value $T_{JMAX}$ of the junction temperature is equal to or below 140° C., the limitation torque τr is reduced gradually by a predetermined value of gradient.

As described above, using the limitation torque τr with respect to the maximum value $T_{JMAX}$ of the junction temperature shown in FIG. 3, the limitation torque τr to the maximum value $T_{JMAX}$ of the junction temperatures calculated at the step S25 is derived. At this time, the CPU of the motor drive controller 12 determines whether the limitation torque τr is smaller than the motor torque demand instruction value τc at a step S29.

At a step S31, the CPU of the motor controller 12 determines whether the present phase domain is the same as the previous one on the basis of the magnetic pole position θ detected by means of the magnetic pole position sensor 10 if τΓ<τc (yes) at the step S29.

In a case where the motor 5 does not rotate so as to change the present phase domain (Yes at the step S31), the routine goes to a step S33 in which Δτ=Δτ+A, wherein A denotes a predetermined constant to be described below.

Then, the routine goes to a step S37 in which the displacement torque Δτ is subtracted from the limitation torque τr(τL=τΓ-Δτ). Then, the routine goes to a step S39 in which the present phase domain is stored.

The motor drive controller 12 controls the drive of the respective switching devices T1 through T6 of the inverter circuit 4 through their bases (gates) in a PWM (Pulse Width Modulation) method so that the output torque τL calculated at the step S37 is outputted from the motor 5. Consequently, the output torque of the motor 5 is reduced. Hence, the motor 5 is rotated so that the electric vehicle is reversed on the ascending slope to a degree such that the vehicle driver does not sense the reverse of the electric vehicle.

Thus, the phase domain is varied with respect to the motor 5. Namely, the driving position of the particular switching device pair of the inverter 4 with respect to the motor 5 is changed to another phase domain.

This causes the motor 5 to be dropped out from the lock state and the switching device in the overheated state due to the locked state of the motor 5 is changed to the other switching device which is not overheated. Consequently, the overheat of the switching devices can be prevented since the overheat causes the corresponding switching device to be destroyed.

On the other hand, if τΓ≧τc (No) at the step S29 or if No at the step S31, the displacement torque Δτ is set to zero at a step S35. Then, at the step S37, the limitation torque τL having the same value as the previous one is outputted from the motor 5.

It is noted that the predetermined constant A at the step S33 used to determine the displacement torque Δτ by which the output torque τL is calculated is preferably a torque such that the electric vehicle is reversed on the ascending slope to the degree that the driver does not sense physically the reverse of the vehicle. This constant A can be given as follows since the phase domain is moved if, for example, the torque of 40 Nm is generated with a drive shaft of the electric vehicle.

$$A \approx 40\,\mathrm{Nm}/(12.7 \times 50 \times 9.81)$$
$$\approx 0.06\,\mathrm{Kgm}/2\mathrm{ms}.$$

As described above, when the motor is locked when the vehicle runs on the ascending slope, the output torque is reduced gradually from the vehicle balanced state, and the phase domain of the motor is varied, the torque in the limit state of the locked motor is generated and is increased so that the locked state of the motor 5 can be released and the overheating of the particular one of the switching devices can be relieved.

The meaning of the phase domain of the motor 5 will be described below.

The phase domain of the motor 5 indicates the status of turned on or off in the switching devices T1 through T6 of the inverter circuit 4 to derive the motor 5.

It is noted that when the upper switching device T1, T3, or T5 of each arm is turned on, the lower switching device T2, T4, or T5 of each arm is turned on, the lower switching device T2, T4, or T6 of the same arm is turned off and vice versa.

It is also noted that the motor drive controller 12 controls a quantity of each phase current flowing through the corresponding switching device Iu, Iv, and Iw flowing through the corresponding switching device T1 or T2, T3 or T4, or T5 or T6 which is turned on so as to regulate the output torque of the motor 5.

The motor drive controller 12 outputs a turn on or turn off command signal to each switching device T1 through T6 of the inverter circuit 4 to turn on or off each corresponding switching device T1 through T6 according to the magnetic pole position θ detected by the magnetic pole position sensor 10.

For example, the status of each switching device T1 through T6 is that the first upper switching device T1 is ON, the first lower switching device T2 is OFF, the second upper switching device T3 is OFF, the second lower switching device T4 is ON, the third upper switching device T5 is OFF, the third lower switching device T6 is ON, if the magnetic pole position θ falls in a range from −30° to 30°.

The state in which each status of the switching devices T1 through T6 is combined as described above (or a range in which the magnetic pole is present) is called the phase domain of the motor 5.

When, furthermore, the magnetic pole position θ is moved from the range of −30° to 30° to the neighboring range of 30° to 90° due to the rotation of the motor 5, the combination of the status of each switching device T1 through T6 is changed. In this case, the phase domain of the motor 5 is changed.

The entire contents of the Japanese Patent Application P10-13038 (filed Jan. 26, 1998) are incorporated herein by reference.

Although the invention has been described above by reference to certain embodiments of the invention, the invention is not limited to the embodiment described above. Modifications and variations of the embodiment described above will occur to those skilled in the art, in light of the above teachings.

The scope of the invention is defined with reference to the following claims.

What is claimed is:

1. A control apparatus for an electric vehicle, comprising:
a motor drive, having a plurality of arms and each arm including a series-connected semiconductor switching device pair, for switching a voltage applied across each switching device of the corresponding one of the switching device pairs from a DC power supply so as to apply an AC power having a plurality of phases of the same number of the arms to the motor, the vehicle being driven by means of the motor;
a sensor for detecting a rotation velocity of the motor;
a torque demand instruction value determinator for determining a value of a torque demand instruction that a vehicle driver has demanded;
a locked state determinator for determining whether the electric vehicle falls in a locked state on the basis of the detected rotation velocity of the motor and the determined torque demand instruction value;
a motor drive controller for controlling switching operations of the respective pairs of the switching devices in the motor drive for the respective switching pairs of the motor drive to supply respective phase currents to the motor so as to regulate an output torque of the motor according to the torque demand instruction value; and
a torque reducer for outputting a command to the motor drive controller to reduce the output torque of the motor so as to change a present phase domain of the motor to another phase domain when the locked state determinator determines that the electric vehicle has fallen in the locked state.

2. A control apparatus for an electric vehicle as claimed in claim 1, further comprising a temperature detector for detecting a temperature of each switching device of the motor drive; a temperature estimator for estimating a junction temperature of each switching device of the motor drive from the detected temperature of each switching device; and a torque calculator for calculating a torque limitation value of the motor with respect to the estimated junction temperature of each switching device of the motor drive; a motor rotation velocity detector for detecting a rotation velocity of the motor; and wherein the torque reducer outputs the command to the motor drive controller to reduce the output torque of the motor by a predetermined value of the torque when the detected rotation velocity of the motor is smaller than a predetermined value of the rotation velocity and the torque demand instruction value is larger than the torque limitation value.

3. A control apparatus for an electric vehicle as claimed in claim 2, wherein the predetermined value of the torque by which the output torque of the motor is reduced is a torque value by which the electric vehicle is reversed to a degree such that a driver of the electric vehicle does not sense that the electric vehicle is reversed.

4. A control apparatus for an electric vehicle as claimed in claim 2, wherein a hysteresis is formed on the predetermined value of the rotation velocity.

5. A control apparatus for an electric vehicle as claimed in claim 4, wherein the predetermined value of the rotation velocity has first and second motor rotation velocity values Np1 and Np2 and the motor drive controller is operated in response to the command from the torque reducer to reduce the torque by the predetermined value of the torque when the detected rotation velocity of the motor is smaller than the first motor rotation velocity value Np1 and the torque demand instruction value is larger than the torque limitation value and when the detected rotation velocity of the motor is larger than the second motor rotation velocity value Np2 and the locked state determinator determines that the electric vehicle has previously fallen in the locked state.

6. A control apparatus for an electric vehicle as claimed in claim 5, wherein the second motor rotation velocity value NP2 is larger than the first motor rotation velocity value Np1 by a predetermined width of the hysteresis.

7. A control apparatus for an electric vehicle as claimed in claim 6, further comprising a time duration determinator for determining whether a state in which the torque demand instruction value is equal to or below the predetermined value of the torque is continued for a predetermined period of time and wherein the torque reducer outputs the command to the motor drive controller to reduce the output torque from the motor by the predetermined value of the torque when the time duration determinator determines that the state is continued within the predetermined period of time and the locked state determinator determines that the electric vehicle has previously fallen in the locked state.

8. A control apparatus for an electric vehicle as claimed in claim 7, further comprising a maximum junction temperature determinator for determining a maximum value $T_{JMAX}$ of the estimated junction temperatures of the respective switching devices; a limitation torque determinator for determining a limitation torque $\tau r$ as a function of the maximum value $T_{JMAX}$ of the estimated junction temperatures; and a torque value determinator for determining whether the limitation torque value $\tau r$ is smaller than the motor torque instruction value $\tau c$.

9. A control apparatus for an electric vehicle as claimed in claim 8, further comprising: a magnetic pole sensor for detecting a magnetic pole position $\theta$ of the motor; a phase domain determinator for determining whether the present phase domain is equal to the previous one on the basis of the detected magnetic pole position $\theta$ when the torque value determinator determines that the limitation torque value $\tau r$ is smaller than the motor torque instruction value $\tau c$; and a displacement torque determinator for determining a displacement torque $\Delta\tau$ as $\Delta\tau=\Delta\tau+A$, wherein A denotes a constant, when the phase domain determinator determines that the present phase domain is equal to the previous one and for determining the displacement torque $\Delta\tau$ as $\Delta\tau=0$ when the phase domain determinator determines that the present phase domain is not equal to the previous one.

10. A control apparatus for an electric vehicle as claimed in claim 9, further comprising an output torque determinator for determining the output torque of the motor $\tau L$ by which the motor is presently outputted at the present phase domain of the motor according to the determined displacement torque $\Delta\tau$ as follows: $\tau L=\tau\Gamma-\Delta\tau$.

11. A control apparatus for an electric vehicle as claimed in claim 10, further comprising a memory for storing the present phase domain of the motor when the limit torque determinator determines the output torque $\tau L$ of the motor as $\tau L=\tau\Gamma-\Delta\tau$.

12. A control apparatus for an electric vehicle as claimed in claim 6, wherein the predetermined width of the hysteresis is approximately 20 rpm.

13. A control apparatus for an electric vehicle as claimed in claim 7, wherein the limitation torque determinator determines the limitation torque which is approximately constant when the maximum value $T_{JMAX}$ is equal to or below a predetermined temperature value and which is inversely proportional to a rise in temperature of the maximum value when the maximum value is above the predetermined temperature value.

14. A control apparatus for an electric vehicle as claimed in claim 13, wherein the predetermined temperature value is approximately 140° C.

15. A control apparatus for an electric vehicle as claimed in claim 14, wherein the limitation torque value $\tau\Gamma$ is approximately 16.2 Nm when the maximum value $T_{JMAX}$ is equal to or below approximately 140° C.

16. A control apparatus for an electric vehicle as claimed in claim 9, wherein A is approximately 0.06 Kgm/2 ms.

17. A control apparatus for an electric vehicle as claimed in claim 2, wherein the predetermined value $\tau_p$ of the torque is a continuously driving enabling torque which is the output torque of the motor when a maximum current for any one of the switching devices of the motor drive to be continuously allowed.

18. A control apparatus for an electric vehicle as claimed in claim 17, wherein the predetermined value $\tau p$ of the torque is approximately 6.5 Kgfm.

19. A control apparatus for a motor driven electric vehicle, comprising:

a motor drive means, having a plurality of arms and each arm including a series-connected semiconductor switching device pair, for switching a voltage applied across each switching device of the corresponding one of the switching device pairs from a DC power supply so as to apply an AC power having a plurality of phases of the same number of the arms to the motor, the vehicle being driven by means of the motor;

sensing means for detecting a rotation velocity of the motor;

torque demand instruction value determining means for determining a value of a torque demand instruction that a vehicle driver has demanded;

locked state determining means for determining whether the electric vehicle falls in a locked state on the basis of the detected rotation velocity of the motor and the determined torque demand instruction value;

motor drive controlling means for controlling switching operations of the respective pairs of the switching devices in the motor drive for the respective switching pairs of the motor drive to supply respective phase currents to the motor so as to regulate an output torque of the motor according to the torque demand instruction value; and a torque reducing means for outputting a command to the motor drive controlling means to reduce the output torque of the motor so as to change a present phase domain of the motor to another phase domain when the locked state determining means determines that the electric vehicle has fallen in the locked state.

20. A control method for a motor driven electric vehicle, comprising:

switching a voltage applied across each semiconductor switching device of a motor drive from a DC power supply so as to apply an AC power having a plurality of phases to the motor, through the motor drive having a plurality of arms of the same number of the phases of the AC power, each arm including a pair of the same series-connected semiconductor switching devices;

detecting a rotation velocity of the motor;

determining a value of a torque demand instruction that a vehicle driver has demanded;

determining whether the electric vehicle falls in a locked state on the basis of the detected rotation velocity of the motor and the determined torque demand instruction value;

controlling switching operations of the respective pairs of the switching devices in the motor drive for the respective switching pairs of the motor drive to supply respective phase currents to the motor through a motor drive controller so as to regulate an output torque of the motor according to the torque demand instruction value; and outputting a command to the motor drive controller to reduce the output torque of the motor so as to change a present phase domain of the motor to another phase domain when determining that the electric vehicle has fallen in the locked state.

\* \* \* \* \*